(12) United States Patent
D'Orazio et al.

(10) Patent No.: US 12,424,191 B2
(45) Date of Patent: Sep. 23, 2025

(54) VOCAL ACOUSTIC ATTENUATION

(71) Applicant: BlackBox Biometrics, Inc., Rochester, NY (US)

(72) Inventors: Angela D'Orazio, Rochester, NY (US); David A. Borkholder, Rochester, NY (US); Scott J. Featherman, Louisburg, NC (US)

(73) Assignee: BlackBox Biometrics, Inc., Rochester, NY (US)

( * ) Notice: Subject to any disclaimer, the term of this patent is extended or adjusted under 35 U.S.C. 154(b) by 371 days.

(21) Appl. No.: 17/798,147

(22) PCT Filed: Feb. 11, 2021

(86) PCT No.: PCT/US2021/017673
§ 371 (c)(1),
(2) Date: Aug. 8, 2022

(87) PCT Pub. No.: WO2021/163336
PCT Pub. Date: Aug. 19, 2021

(65) Prior Publication Data
US 2023/0070560 A1    Mar. 9, 2023

Related U.S. Application Data

(60) Provisional application No. 62/975,399, filed on Feb. 12, 2020.

(51) Int. Cl.
*G10K 11/00* (2006.01)
*H04R 1/08* (2006.01)

(52) U.S. Cl.
CPC .......... *G10K 11/002* (2013.01); *H04R 1/086* (2013.01)

(58) Field of Classification Search
CPC .......... H04R 1/086; H04R 1/08; H04R 1/083
See application file for complete search history.

(56) References Cited

U.S. PATENT DOCUMENTS

| | | |
|---|---|---|
| 2,958,740 A | 11/1960 | Kirk |
| 3,977,257 A | 8/1976 | Steger |
| 4,153,815 A | 5/1979 | Chaplin et al. |
| 4,441,576 A | 4/1984 | Allen |
| 5,220,535 A | 6/1993 | Brigham et al. |
| 5,473,729 A | 12/1995 | Bryant et al. |
| 5,504,717 A | 4/1996 | Sharkey et al. |
| 5,586,086 A | 12/1996 | Permuy et al. |

(Continued)

FOREIGN PATENT DOCUMENTS

| | | |
|---|---|---|
| EP | 4104454 | 12/2022 |
| WO | 2016176007 | 11/2016 |
| WO | WO-2021163336 A1 | 8/2021 |

OTHER PUBLICATIONS

"International Application Serial No. PCT/US2021/017673, International Search Report mailed Apr. 22, 2021", 3 pgs.

(Continued)

*Primary Examiner* — Suhan Ni
(74) *Attorney, Agent, or Firm* — Nelson Mullins Riley & Scarborough LLP

(57) ABSTRACT

Systems and methods to provide vocal acoustic attenuation for an acoustic sensor are disclosed, comprising attenuating an acoustic signal using an attenuation material covering at least a portion of a first surface of the acoustic sensor.

20 Claims, 4 Drawing Sheets

(56) References Cited

U.S. PATENT DOCUMENTS

| | | |
|---|---|---|
| 5,703,835 A | 12/1997 | Sharkey et al. |
| 5,917,775 A | 6/1999 | Salisbury |
| 6,552,963 B2 | 4/2003 | Baranek |
| 6,841,766 B2 | 1/2005 | Gauthier, Jr. et al. |
| 6,847,587 B2 | 1/2005 | Patterson et al. |
| 6,965,541 B2 | 11/2005 | Lapin et al. |
| 7,139,222 B1 | 11/2006 | Baxter et al. |
| 7,203,132 B2 | 4/2007 | Berger |
| 7,266,045 B2 | 9/2007 | Baxter |
| 7,401,519 B2 | 7/2008 | Kardous |
| 7,411,865 B2 | 8/2008 | Calhoun |
| 7,420,878 B2 | 9/2008 | Holmes et al. |
| 7,474,589 B2 | 1/2009 | Showen et al. |
| 7,532,542 B2 | 5/2009 | Baxter et al. |
| 7,536,301 B2 | 5/2009 | Jaklitsch et al. |
| 7,536,388 B2 | 5/2009 | Jung et al. |
| 7,586,812 B2 | 9/2009 | Baxter et al. |
| 7,599,252 B2 | 10/2009 | Showen et al. |
| 7,602,329 B2 | 10/2009 | Manderville et al. |
| 7,688,679 B2 | 3/2010 | Baxter et al. |
| 7,710,278 B2 | 5/2010 | Holmes et al. |
| 7,710,828 B2 | 5/2010 | Barger et al. |
| 7,719,428 B2 | 5/2010 | Fisher et al. |
| 7,750,814 B2 | 7/2010 | Fisher et al. |
| 7,751,282 B2 | 7/2010 | Holmes et al. |
| 7,755,495 B2 | 7/2010 | Baxter et al. |
| 7,796,470 B1 | 9/2010 | Lauder et al. |
| 7,941,188 B2 | 5/2011 | Jung et al. |
| 7,961,550 B2 | 6/2011 | Calhoun |
| 8,036,065 B2 | 10/2011 | Baxter et al. |
| 8,063,773 B2 | 11/2011 | Fisher et al. |
| 8,111,582 B2 | 2/2012 | Beck et al. |
| 8,134,889 B1 | 3/2012 | Showen et al. |
| 8,229,134 B2 | 7/2012 | Duraiswami et al. |
| 8,325,562 B2 | 12/2012 | Showen |
| 8,325,563 B2 | 12/2012 | Calhoun et al. |
| 8,369,184 B2 | 2/2013 | Calhoun |
| 8,428,275 B2 | 4/2013 | Yoshida et al. |
| 8,469,144 B2 | 6/2013 | Pilaar |
| 8,633,818 B2 | 1/2014 | Anson et al. |
| 8,750,544 B2 | 6/2014 | Killion et al. |
| 8,848,929 B2 | 9/2014 | Schiller et al. |
| 8,995,227 B1 | 3/2015 | Johnson |
| 9,057,777 B2 | 6/2015 | Guignard et al. |
| 9,198,800 B2 | 12/2015 | Killion et al. |
| 9,218,728 B2 | 12/2015 | Bickel et al. |
| 9,240,114 B2 | 1/2016 | Showen et al. |
| 9,348,010 B1 | 5/2016 | Showen |
| 9,380,397 B2 | 6/2016 | Kane et al. |
| 9,478,229 B2 | 10/2016 | Lacirignola et al. |
| 9,602,673 B2 | 3/2017 | Boyden et al. |
| 9,666,208 B1 | 5/2017 | Rubin et al. |
| 9,721,456 B2 | 8/2017 | Thurlow et al. |
| 9,795,514 B2 | 10/2017 | Meegan et al. |
| 9,800,738 B2 | 10/2017 | Boyden et al. |
| 9,805,569 B2 | 10/2017 | Kane et al. |
| 9,830,932 B1 | 11/2017 | Gunderson et al. |
| 9,848,269 B2 | 12/2017 | Eberbach et al. |
| 9,875,643 B1 | 1/2018 | Sarna, II |
| 9,980,028 B2 | 5/2018 | McNeill et al. |
| 10,014,003 B2 | 7/2018 | Kim et al. |
| 10,032,351 B2 | 7/2018 | Showen et al. |
| 10,068,451 B1 | 9/2018 | Werner et al. |
| 10,127,796 B2 | 11/2018 | Thurlow et al. |
| 10,156,472 B2 | 12/2018 | Coleman |
| 10,171,677 B2 | 1/2019 | Boyden et al. |
| 10,225,672 B2 | 3/2019 | Lacirignola et al. |
| 10,264,999 B2 | 4/2019 | Lacirignola et al. |
| 10,282,949 B2 | 5/2019 | Penland |
| 10,332,326 B2 | 6/2019 | Penland |
| 10,424,048 B1 | 9/2019 | Calhoun et al. |
| 10,945,063 B2 * | 3/2021 | Liu .............. H04R 5/0335 |
| 2008/0219100 A1 | 9/2008 | Fisher et al. |
| 2008/0221793 A1 | 9/2008 | Fisher et al. |
| 2009/0002494 A1 | 1/2009 | Calhoun |
| 2010/0118658 A1 | 5/2010 | Showen et al. |
| 2010/0278013 A1 | 11/2010 | Holmes et al. |
| 2011/0255728 A1 | 10/2011 | Abe et al. |
| 2012/0170412 A1 | 7/2012 | Calhoun et al. |
| 2013/0092576 A1 | 4/2013 | Rayner |
| 2015/0139432 A1 | 5/2015 | Barwicz et al. |

OTHER PUBLICATIONS

"International Application Serial No. PCT/US2021/017673, Written Opinion mailed Apr. 22, 2021", 6 pgs.

"Australian Application Serial No. 2021218779, Response filed Aug. 14, 2023 to First Examination Report mailed Apr. 19, 2023", 66 pgs.

"Australian Application Serial No. 2021218779, Subsequent Examiners Report mailed Sep. 5, 2023", 4 pgs.

"Canadian Application Serial No. 3,167,782, Examiners Rule 86(2) Report mailed Sep. 22, 2023", 4 pgs.

"International Application Serial No. PCT US2021 017673, International Preliminary Report on Patentability mailed Aug. 25, 2022", 8 pgs.

"Australian Application Serial No. 2021218779, First Examination Report mailed Apr. 19, 2023", 3 pgs.

"European Application Serial No. 21754279.4, Extended European Search Report mailed Jul. 4, 2023", 9 pgs.

* cited by examiner

VOCAL ACOUSTIC ATTENUATION

CLAIM OF PRIORITY

This application is a U.S. National Stage Filing under 35 U.S.C. 371 from International Patent Application Serial No. PCT/US2021/017673, filed Feb. 11, 2021, published on Aug. 19, 2021 as WO 2021/163336, which application claims the benefit of priority under 35 U.S.C. § 119(e) of U.S. Provisional Patent Application Ser. No. 62/975,399, filed on Feb. 12, 2020, both of which are herein incorporated by reference in entireties.

BACKGROUND

Unwanted or excessive sound can have deleterious effects on human health. Sounds having sound pressure levels (SPLs) above 85 decibels (dB) for extended periods of time can damage structures of the inner ear, leading to hearing loss. The Occupational Safety and Health Administration (OSHA) estimates that 22 million workers are exposed to potentially damaging noise at work each year in the United States alone, and requires the employers implement hearing conservation programs when noise exposure is at or above 85 decibels averaged over 8 working hours, or an 8-hour time-weighted average (TWA). Exposure to sound events at more than 105 dB average (dBA) will cause some amount of permanent hearing loss.

In addition, exposure to impulse events, such as blast exposure, can produce high intensity overexposures, often referred to as blast overpressure (BOP), which can pose both a risk of NIHL and a risk of traumatic brain injury (TBI) with one or more cumulative exposures. Impulse events also include impulse noise events, such as gunshots, explosions, or other sound events having fast initial rise times, such as of 50 µs or less (e.g., frequencies of 20 kHz or higher), often with SPLs above 140 dB (depending on distance from the event).

Noise-induced hearing loss (NIHL) is the most prevalent service-related disability for US veterans, with VA-related expenditures exceeding $1b USD annually. Hearing protection devices (HPDs) provide some protection from noise exposure, but suffer intrinsic limitations, such as noise levels exceeding protective capabilities, bone conduction through the skull bypassing the HPD, operational requirements for long exposure periods or communication requirements, compliance issues, improper fit, or unexpected exposure to events when the HPD is not worn.

There is a need to monitor human exposure to excessive acoustic and impulse events using stationary sensors configured to monitor acoustic or impulse events from stationary locations and portable, ambulatory sensors configured to be attached to or incorporated in equipment or worn by a user.

SUMMARY

Systems and methods to provide vocal acoustic attenuation for an acoustic sensor are disclosed, comprising attenuating an acoustic signal (e.g., acoustic pressure waves, impulse or blast pressure waves, etc.) using an attenuation material covering at least a portion of a first surface of an acoustic sensor. In an example, the acoustic sensor can include a microphone package having a sound port in the first surface, and the attenuation material can be configured to cover the sound port. In certain examples, an adhesive material can adhere the attenuation material to the acoustic sensor. Attenuating the acoustic signal can include attenuating a vocal audible decibel range, such as a conversational vocal audible decibel range from the acoustic signal, such as to a range below a noise floor of the acoustic sensor, prior to the acoustic signal reaching the acoustic sensor. Vocal acoustic attenuation can include attenuation of audible and inaudible acoustic frequency ranges (e.g., less than 20 Hz, greater than 20 kHz, etc.). In an example, vocal acoustic attenuation can provide 60 dB of attenuation.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
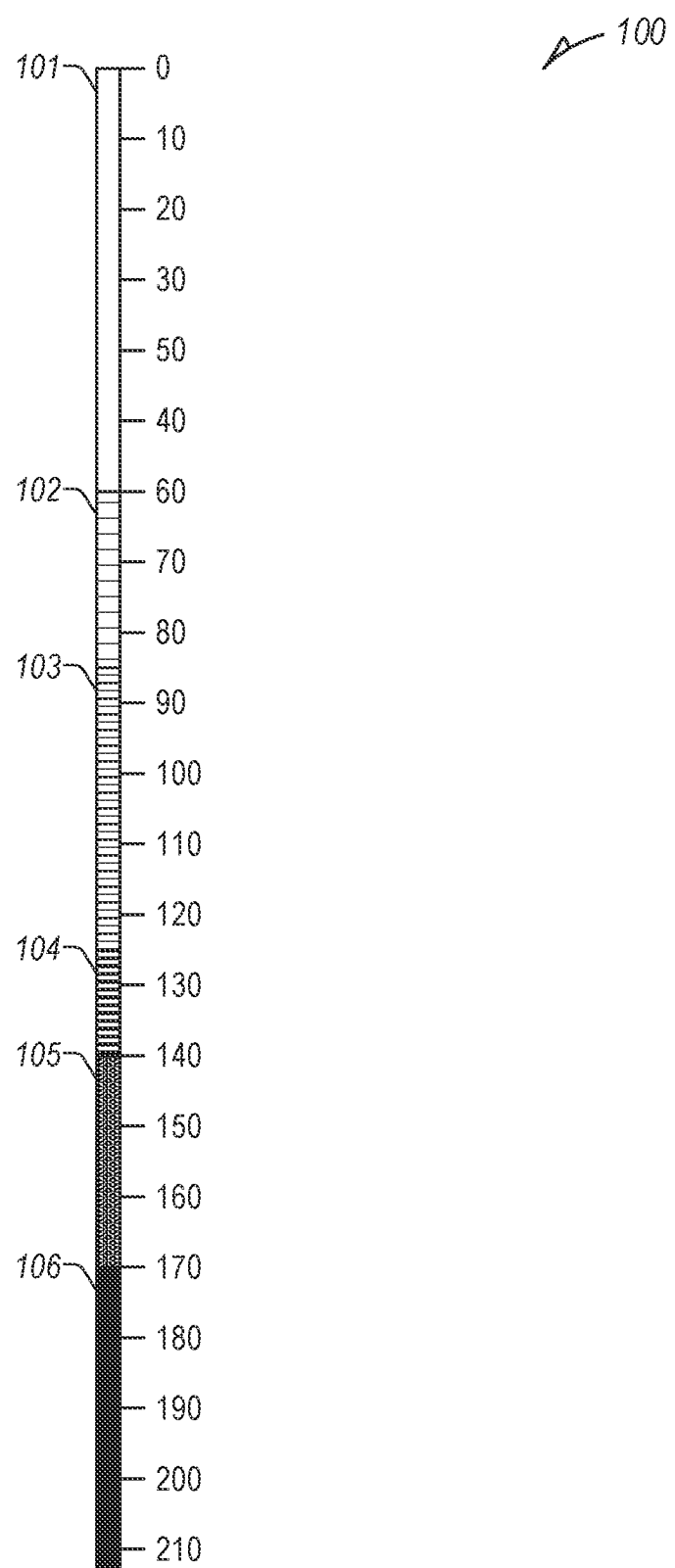
FIG. 1 illustrates an example sound scale in decibels (dB).

Exposure to acoustic or impulse events can be monitored using one or more stationary or ambulatory sensors. However, each type of sensor, stationary or ambulatory, pose different privacy risks, such as inadvertently detecting, recording, or storing private or sensitive audio, such as human voice conversations or vocal audio from one or more locations with respect to one or more stationary sensors, all human voice conversations or vocal audio associated with one or more persons with respect to one or more ambulatory sensors, or both with respect to systems having stationary and ambulatory sensors.

The present inventors have recognized, among other things, systems and methods to monitor exposure to acoustic or impulse events without recording audible human speech, such as by suppressing or attenuating the vocal audible decibel range prior to the acoustic signal reaching an acoustic or impulse sensor or transducer, referred to herein as an acoustic sensor, such as a microphone. In certain examples, a physical attenuator can be placed over the acoustic sensor configured to suppress or attenuate the vocal audible range from being output by the acoustic sensor. Such attenuation is not to provide location information for an acoustic or impulse event, such as to differentiate signal response to triangulate or locate a source of the acoustic or impulse event, but to suppress or attenuate (e.g., through reflection or absorption) audible human speech (e.g., a conversational vocal audible decibel range having sound pressure levels below 60 dB, etc.), providing data security and data privacy, while still accurately monitoring acoustic or impulse events having SPLs above the range of audible human speech, such as above 60 dB, etc. Such vocal audible range need not be completely suppressed or attenuated from the acoustic sensor to provide data privacy or security, but suppressed or attenuated below the noise floor of the acoustic sensor (e.g., at or below 30 dB, etc.), such that an attenuated vocal audible signal (e.g., a conversational audible signal) in the vocal audible range would be indiscernible from noise, and may not be accurately reproduced, providing a robust data security and privacy solution.

In an example, the physical attenuator can provide 60 dB of attenuation, thereby attenuating sound pressure levels at or below 90 dB to a level below the noise floor of the acoustic sensor, such as 30 dB, etc. In various examples, different acoustic sensors can have different noise floors (e.g., 35 dB, 30 dB, 27 dB, etc.), such that an amount of attenuation required to suppress or attenuate the vocal audible range of sound pressure levels can vary. Further, the amount of physical attenuation can vary depending on one or more properties of the physical attenuator.

FIG. 1 illustrates an example sound scale 100 in decibels (dB) from zero (0) dB to over 210 dB, including six ranges of sound, from comfortable, to annoying, extremely loud, painful, intolerable, or extremely harmful.

A first range of sound 101 is between zero (0) dB and sixty (60) dB. Zero (0) dB is the sound of a flying mosquito from 10 feet away. Ten (10) dB is the sound of a hum of an incandescent light bulb or the sound of a pin dropped from 1 cm from 1 m away. Twenty (20) dB is the sound of leaves rustling. Thirty (30) dB is the sound of whispering from a few feet away. The noise floor of many acoustic sensors is below 35 dB, often between 20 dB and 30 dB (e.g., 27 dB, etc.). Sixty (60) dB is the sound level of normal conversation.

A second range of sound 102 is between sixty (60) dB and eighty-five (85) dB. Seventy (70) dB is the sound of a vacuum cleaner. Eighty (80) dB is the sound of a garbage disposal.

A third range of sound 103 is between eighty-five (85) dB and one hundred and twenty-five (125) dB. Ninety (90) dB is the sound of a lawnmower or food blender. One hundred (100) dB is the sound of a motorcycle, a jackhammer, or a stereo at max volume. One hundred and ten (110) dB is the sound of a car horn, and the sound at which the human body begins to perceive vibration at low frequencies. One hundred and twenty (120) dB is the sound of a loud rock concert, where pain to the human ear begins.

A fourth range of sound 104 is between one hundred and twenty-five (125) dB and one hundred and forty (140) dB. One hundred and thirty (130) dB is the loudest human scream at 3 m, or the sound of a jet engine at 30 m, where the feeling of eardrum flexing is perceptible to a human. One hundred and forty (140) dB is the sound of a gunshot, where a single exposure can cause permanent ear damage.

A fifth range of sound 105 is between one hundred and forty (140) dB and one hundred and seventy (170) dB. Many acoustic sensors cannot distinguish between SPL above 140 dB. One hundred and sixty (160) dB is the sound level inside a speaker at a rock concert, where permanent hearing loss is likely. One hundred and seventy (170) dB is the sound level of the Saturn V launch from 100 m.

A sixth range of sound 106 is between one hundred and seventy (170) dB and over two hundred and ten (210) dB. Impulse events can be measured having sound levels above two hundred (200) dB, even above two hundred and ten (210) dB.

Figure 2:
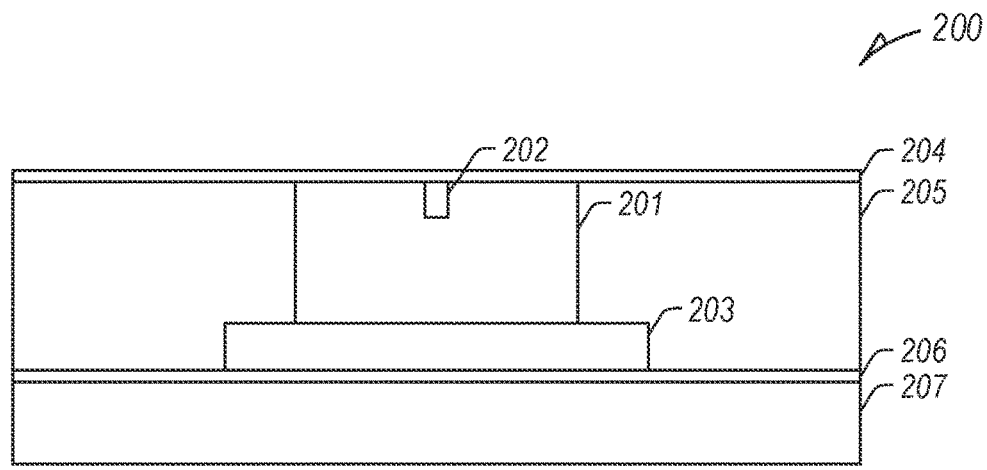
FIG. 2 illustrates an example system including an acoustic sensor including a sound port in a first surface of the acoustic sensor and an attenuation material covering the sound port and at least a portion of the first surface of the acoustic sensor.

FIG. 2 illustrates an example system 200 including an acoustic sensor 201 including a sound port 202 (e.g., a microphone port), the acoustic sensor 201 mounted on a surface of a printed circuit board (PCB) 203. The sound port 202 can be located on a first surface of the acoustic sensor 201. In an example, the first surface of the acoustic sensor 201 can include a top surface of the acoustic sensor 201, a bottom surface of the acoustic sensor 201, or one or more other surfaces of the acoustic sensor comprising the sound port 202.

The system 200 can include a housing material 205 (e.g., housing polymer) configured to at least partially encapsulate the acoustic sensor 201 and PCB 203. In an example, the housing material 205 or the PCB 203 can be coupled to a substrate 207 using an adhesive material 206 or using one or more other approaches (e.g., molding, overmolding, etc.). In an example, the adhesive material 206 can attach the housing material 205 to the substrate 207, and in certain examples, dampen vibration or shock between the substrate 207 and the housing material 205 at least partially encapsulating the acoustic sensor 201. In certain examples, electrical connections (e.g., wires, conductors, etc.) can be routed into or out of the system 200 or from the acoustic sensor 201 to the substrate 207 through the adhesive material 206 or between the adhesive material 206 and the housing material 205. In other examples, the adhesive material 206 can dampen sound received at the acoustic sensor 201. The housing material 205 and the substrate 207 can include the same or different materials.

The acoustic sensor 201 can include a microphone, such as a micro electro-mechanical systems (MEMS) analog or digital microphone integrated circuit (IC). A MEMS analog microphone can include a MEMS transducer, such as a variable MEMS electrical element (e.g., a MEMS capacitor, membrane, etc.) configured to convert a received acoustic signal (e.g., pressure waves, such as acoustic pressure waves, impulse or blast pressure waves, etc.), such as received through the sound port 202, into a first electrical signal (e.g., an impedance, a voltage, a current, etc.), and an amplifier to convert the first electrical signal into a usable, analog output signal (e.g., an impedance, a voltage, a current, etc.) representative of the received acoustic pressure wave. The analog output signal from the MEMS analog microphone IC is typically provided to an analog-to-digital converter (ADC) configured to convert the analog output signal into a digital audio signal, such as for storage in memory (e.g., volatile or non-volatile memory), or use by one or more processors, circuits, or electronic systems for further processing, analysis, or use. A MEMS digital microphone IC can include the ADC. In certain examples, the acoustic sensor 201 can have an acoustic overload point at SPLs under 140 dB (e.g., 132 dB, 129 dB, etc.), and thus cannot accurately detect sound pressure levels with any granularity above that range. In an example, the acoustic sensor 201 can have a noise floor at or below 35 dB (e.g., 27 dB, etc.), and thus cannot accurately distinguish or reproduce audio signals having SPLs at or below the noise floor.

The system 200 can include an attenuation material 204 (e.g., a physical attenuator) configured to cover the sound port 202 of the acoustic sensor 201. The attenuation material 204 can suppress or attenuate a received acoustic pressure wave, such as through reflection or absorption, such that the vocal acoustic audio range is suppressed or attenuated before the resulting signal is received by electronic, electrical, or electromechanical circuit elements, including the acoustic sensor 201 through the sound port 202, increasing data security and privacy in contrast to other systems. In certain examples, such suppression or attenuation can enable the acoustic sensor 201 to distinguish between sound events having SPLs above the typical dynamic range of the acoustic sensor 201 (e.g., above 140 dB, etc.), while also providing a level of data security and data privacy in vocal audio suppression.

In an example, the attenuation material 204 can be secured to the acoustic sensor 201 covering the sound port 202. The attenuation material 204 can be configured to reduce or eliminate acoustic transmission to the sound port 202. In an example, the attenuation material 204 can be secured to a portion of the first surface of the acoustic sensor 201, such as using an adhesive material, directly molded to the first surface, or otherwise secured or held in place, such as by a clip, fastener, overmold, etc. In an example, the attenuation material 204 can be rigidly mechanically binded to the acoustic sensor 201. In other examples, the attenuation material 204 can include a plug configured to be secured at least partially or entirely within the sound port 202, such as using an adhesive, overmold, etc. In other examples, the attenuation material 204 can include a polymer material configured to be placed over or into the sound port 202, and to adhere or affix to the sound port 202 or the acoustic sensor 201 without additional adhesive, intervening plug material, etc. In certain examples, the attenuation material 204 can be secured to the acoustic sensor 201 to reduce or eliminate fluid communication (including air communication) between the sound port 202 and an area over the first surface of the acoustic sensor 201, such as to reduce or eliminate acoustic transmission of an acoustic signal from outside of the acoustic sensor 201 to the sound port 202 (e.g., through the attenuation material 204).

In an example, the attenuation material 204 can include a polyester material (e.g., 0.5 mil, 0.013 mm) having a first surface (e.g., a top surface) and a second surface (e.g., a bottom surface). In an example, the attenuation material 204 can be secured to the first surface of the acoustic sensor 201 using an adhesive (e.g., a laminate or acrylic adhesive, etc.) between the second surface (e.g., the bottom surface) of the polyester material and the first surface of the acoustic sensor 201. In an example, in addition to the adhesive between the second surface of the polyester material and the first surface of the acoustic sensor 201, one or more layers of additional attenuation material can be placed over the attenuation material 204, such as over a first surface (e.g., a top surface) of the polyester material using the same or different adhesive. In other examples, the attenuation material 204 does not include an adhesive, and can be held in place on or against the first surface of the acoustic sensor 201, such as using a molding material encapsulating at least a portion of the attenuation material 204 and the first surface of the acoustic sensor 201, etc.

Various attenuation materials and configurations were tested to provide the desired dampening performance. For example, different materials were adhered over the acoustic sensor 201 using double coated tape (e.g., with a hole over the sound port 202 and the liner material removed), including different polymer materials (e.g., mylar, buna-n, butyl, closed-cell epichlorohydrin (ECH), ethylene propylene diene monomer (EPDM), latex, neoprene, natural rubber, polyethylene, polyurethane, Santoprene, styrene-butadiene rubber (SBR), silicon, polytetrafluoroethylene (PTFE), expanded PTFE (ePTFE), polyvinyl chloride (PVC), vinyl, etc.), metals (e.g., steel, aluminum, etc.), etc. The present inventors determined that placing a hole in the double coated tape over the sound port 202 created an air gap and limited attenuation across tested materials. However, the polyester material and adhesive covering the sound port 202 on the surface of the acoustic sensor 201 without any additional air gap provided sufficient attenuation, in certain examples greater than 60 dB (e.g., 66-69 dB, etc.). In other examples, polyimide film tape (e.g., Kapton® tape (0.0056 inches thick), etc.) with acrylic adhesive (on one or both sides) or silicone adhesive (on one or both sides) and aluminum foil tape with acrylic adhesive (on one or both sides) provided similar performance directly adhered to the acoustic sensor 201 over the sound port 202 without an additional air gap.

In an example, the adhesive covering the first surface of the attenuation material 204 can have a different thickness than the adhesive covering the second surface of the attenuation material 204 (e.g., 2.8 mil and 3.4 mil of acrylic adhesive, respectively, etc.). In certain examples, adjusting dampening material thickness can impact dampening performance (e.g., increased adhesive thicknesses can increase attenuation, such as by adjusting absorption, etc.). In other examples, covering the sound port 202 with an adhesive (or providing an adhesive covering the second surface of the attenuation material 204) can reduce the chance of any remaining or additional air gap between the sound port 202 and the attenuation material 204, or reduce vibration of the attenuation material 204 over the sound port 202.

In certain examples, the attenuation material 204 can extend over the first surface of the acoustic sensor 201, past the border between the acoustic sensor 201 and the housing material 205, such as to seal any air gaps between the first surface of the acoustic sensor 201 and the housing material 205, which can improve dampening performance of the system 200, or reduce the potentially negative impact of manufacturing or other defects over the life of the system 200.

In other examples, the attenuation material 204 can be integrated into the packaging of the system 200, such that one or more of the body or packaging of the acoustic sensor 201 (e.g., a MEMS microphone IC) or the housing material 205 can be made of the attenuation material. In this example, the acoustic sensor 201 does not have a sound port in a first surface (as illustrated in FIG. 2), but instead the sound port 202 forms a cavity above the sensor inside the housing of the acoustic sensor 201, isolated from the first surface by the attenuation material 204. In this example, the attenuation material 204 can include standard packaging material (e.g., polymer, plastic, ceramic, etc.) with an acoustic impedance configured to provide desired attenuation, as described herein.

In certain examples, in addition to or separate from the attenuation material 204, the first electrical signal or the analog output signal can be filtered before converting the analog signal into a digital audio signal, such as using one or more analog filter circuits configured to attenuate, filter, or suppress human vocal audio prior to providing the analog audio signal to the ADC. The analog audio signal can be filtered to attenuate, filter, suppress, or remove human vocal audio prior to storage (e.g., in memory) of the audio signal. Analog filtering of the first electrical signal or the analog output signal to obfuscate or attenuate human voice typically includes filtering one or more frequency ranges associated with human speech, in contrast to the suppression or attenuation of the vocal audible decibel range prior to sensing the audio signal, such as described above.

Figure 3:
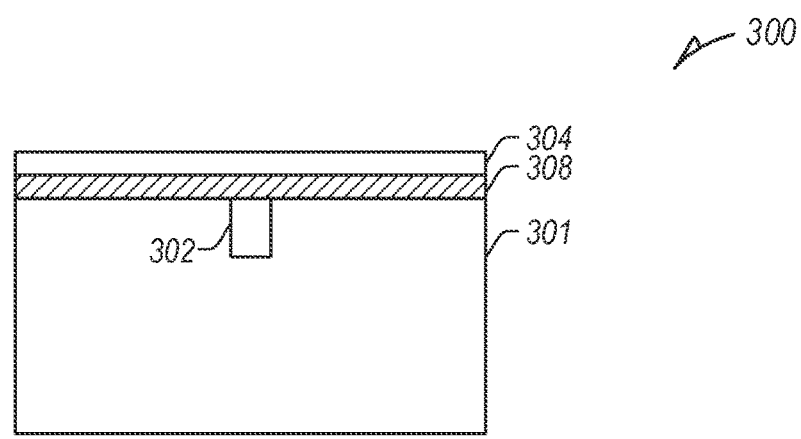
FIG. 3 illustrates a portion of an example system including an adhesive material between an attenuation material and a first surface of an acoustic sensor including a sound port.

FIG. 3 illustrates a portion of an example system 300 including an acoustic sensor 301 including a sound port 302 (e.g., a microphone port) on a first surface of the acoustic sensor 301, an attenuation material 304, and an adhesive material 308 between the first surface of the acoustic sensor 301 and a first surface of the attenuation material 304, including a portion of the adhesive material 308 over the sound port 302 of the acoustic sensor. In an example, the adhesive material 308 can include adhesive from a first side of a tape (e.g., a first side of a double-stick tape) and the attenuation material 304 can include a carrier material of the tape.

Figure 4:
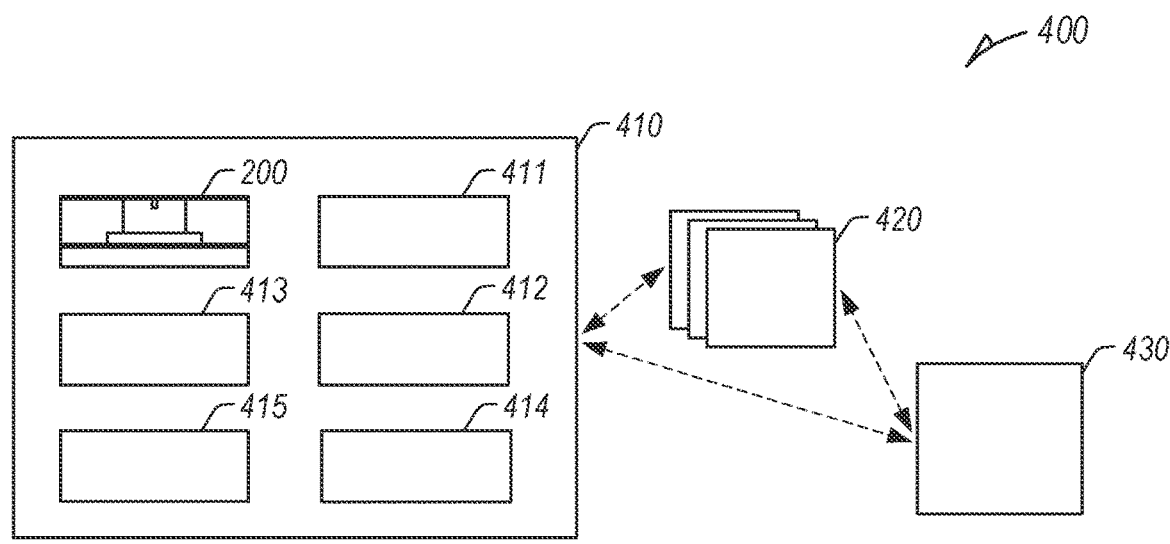
FIG. 4 illustrates an example system including a plurality of dosimeters and a central processing device.

FIG. 4 illustrates an example system 400 including a dosimeter 410. The dosimeter 410 can include components of the system 200 of FIG. 2 and additional components configured to enable the system 200 to operate as a networked or stand-alone dosimeter device. The dosimeter 410 can include a dosimeter circuit 411 (or one or more other processors or control circuits) configured to receive information from an acoustic sensor (e.g., the acoustic sensor 201) of the system 200 and to measure or monitor exposure to time-aggregate acoustic sound exposure or acoustic or impulse events. The dosimeter 410 can include a telemetry circuit 412 configured to provide communication (wired or wireless) into or out of the dosimeter 410 according to one or more communication protocols. In certain examples, the telemetry circuit 412 can be configured for one or both of wired and wireless communication, in certain examples, separately selectable by a user, etc.

In an example, the dosimeter 410 can include a housing (e.g., a wearable housing configured to be worn by a user, a non-wearable housing configured to be fixed to a specific location, etc.) configured to house the system 200, the dosimeter circuit 411, the telemetry circuit 412, and a power source 413 configured to provide power to the system 400. In certain examples, the dosimeter 410 can include one or more audible or visual indicators 414 configured to provide one or more indications to a user (e.g., lights, speakers, a display screen, etc.), and one or more inputs 415 (e.g., button interfaces, a touch-screen interface, etc.) configured to receive user input, commands, etc. In certain examples, the dosimeter 410 can include one or more elastic cords or other physical attachments to enable secure attachment to the body or one or more other pieces of equipment, etc.

In an example, the power source 413 can include a rechargeable battery. In other examples, the power source 413 can specifically include a non-rechargeable battery configured to provide power for the components of the dosimeter 410 for a substantial time period, such as up to 1-year or more, and the remaining components of the dosimeter 410 can be configured for such long-term use (e.g., wired telemetry, etc.). In an example, the power source 413 can be a replaceable battery, rechargeable or non-rechargeable.

In an example, the dosimeter circuit 411 can include an ADC, or one or more amplifiers, pre-amplifiers, filter circuits, etc., configured to process an attenuated output signal from the system 200. The dosimeter circuit 411 can be configured to detect and record acoustic information, such as acoustic or impulse event signatures in real time, where vocal audio signals are not present or distinguishable in the acoustic information, such as due to the suppression or attenuation by the system 200, and in certain examples, the noise floor of the acoustic sensor 201. The dosimeter circuit 411 can be configured to distinguish between impulse events (e.g., blast overpressure (BOP)) and other acoustic events, such as by using a detected rise time, frequency, event signature, etc., and separately account for such event types, and distinguish separate harms to the user, including between NIHL and TBI, etc. In addition, the dosimeter circuit 411 can be configured to identify and reject mechanical impulse or mechanical shock events, such as due to motion or physical touching or contact of the dosimeter 410, separate from an acoustic or impulse event, using signal characteristics, such as rise time, frequency, event signature, etc.

In addition, the dosimeter circuit 411 can be configured to measure or determine exposure to adverse acoustic SPLs or acoustic or impulse events over various time periods, such as over a 24-hour period, an 8-hour period, or longer or shorter time periods, to avoid deleterious effects to a user exposed to such adverse events. In an example, using information from the dosimeter circuit 411 or information received from one or more other control circuits or processors, such as through the telemetry circuit 412, the one or more audible or visual indicators 414 can be configured to alert a user that one more harmful exposure levels is approaching or has been exceeded. In other examples, the one or more audible or visual indicators 414 can notify a user that no harmful events or levels have been detected or exceeded.

In certain examples, the dosimeter 410 can include one or more location sensors, such as GPS, cellular, or other location-based sensors. The dosimeter 410 can further include one or more other atmospheric or environmental sensors (e.g., temperature, atmospheric pressure, etc.). In certain examples, the dosimeter circuit 411 can be configured to adjust the measurement or monitoring of acoustic or impulse exposure or events using the received atmospheric or environmental information. In certain examples, the dosimeter circuit 411 can include a clock and can be configured to store a log of timestamped events, such as having SPLs above a certain level, specific signatures, etc.

In an example, the system 400 can include one or more additional dosimeters 420, including one or more components illustrated in the dosimeter 410, additional acoustic sensors, etc., or one or more additional stationary housings, sensors, or sensor systems. The system 400 can further include a central processing device 430 including one or more circuits or processors configured to provide information to or receive information from one or multiple sensors, such as one or more sensors associated with a single user, sensors associated with multiple users, one or more stationary sensors, or combinations thereof. The central processing device 430 can store information from the dosimeter 410 or the one or more additional dosimeters 420 or stationary housings, sensors, or sensor systems. In an example, the central processing device 430 can include a portable or non-portable computer hub, such as a tablet or a personal computer, configured to collect data from one or more acoustic sensors, dosimeters, etc., and store information for analysis, such as with respect to one or more acoustic sensors, dosimeters, users, groups of users, geographic area, etc., in a database.

Figure 5:
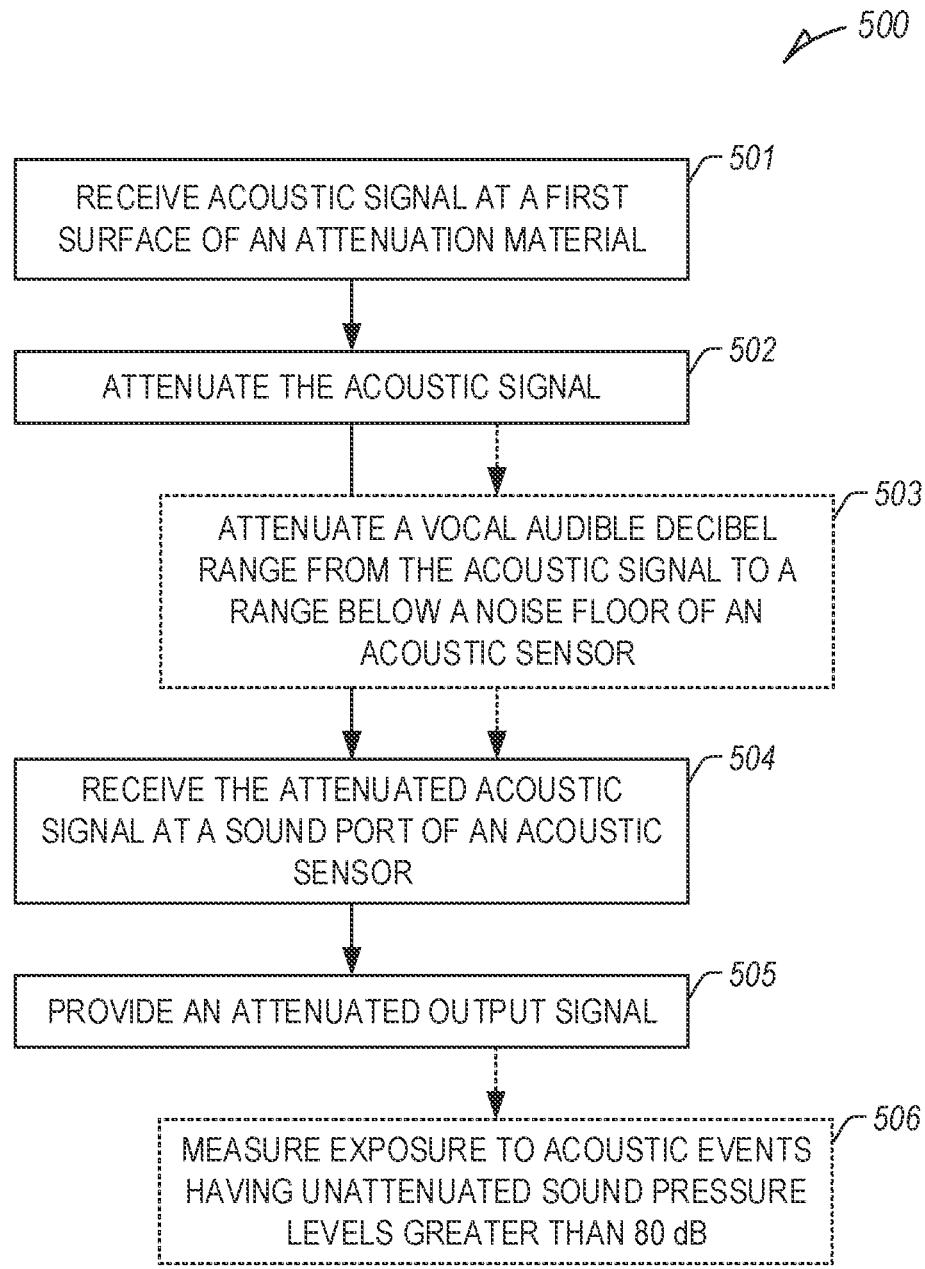
FIG. 5 illustrates an example attenuation method.

FIG. 5 illustrates an example attenuation method 500. At 501, an acoustic signal can be received at a first surface of an attenuation material secured or affixed to an acoustic sensor having a sound port in a first surface of the acoustic sensor. The attenuation material can include a physical material configured to at least partially or fully cover the sound port of the acoustic sensor and to suppress or attenuate a received acoustic pressure wave.

In certain examples, the attenuation material can be secured to the acoustic sensor and covering the sound port to reduce an air gap over the sound port, or to reduce or eliminate fluid communication (e.g., including air movement, etc.) between the sound port and an area over the first surface of the acoustic sensor, such as an area immediately surrounding the first surface of the acoustic sensor.

In an example, the attenuation material can include a tape material having an adhesive covering the sound port of the acoustic sensor. In other examples, one or more other materials can be used, secured or affixed over at least a portion or all of the sound port of the acoustic sensor using a tape, an adhesive, or one or more other attachments.

At 502, the acoustic signal received at the first surface of the attenuation material can be attenuated by the attenuation material. At 503, a vocal audible decibel range can be attenuated from the acoustic signal to a range below a noise floor of the acoustic sensor. In certain examples, the vocal audible decibel range can include acoustic sound pressure levels below 90 dB (or one or more other vocal audible decibel ranges). In an example, the noise floor of the acoustic sensor can be a level below 35 dB (or one or more other levels, such as 30 dB, 27 dB, etc.).

At 504, the attenuated acoustic signal can be received at the sound port of the acoustic sensor. In various examples, the acoustic sensor can include a microphone, such as a micro electro-mechanical systems (MEMS) analog or digital microphone integrated circuit (IC), such as described herein. At 505, an attenuated output signal, such as an electrical signal representative of the received attenuated acoustic pressure wave, can be provided by the acoustic sensor.

At 506, exposure to acoustic events can be measured using the attenuated output signal. The exposure can be measured using a dosimeter circuit. In certain examples, the dosimeter circuit can measure exposure to certain sound pressure levels, such as greater than a threshold, aggregate exposure, including general exposure or exposure of events having specific levels, such as exposure to acoustic events having unattenuated sound pressure levels greater than 80 dB, etc., can be measured using the dosimeter circuit, in certain examples, with respect to specific time periods (e.g., 8 hours, 12 hours, 24 hours, etc.).

Figure 6:
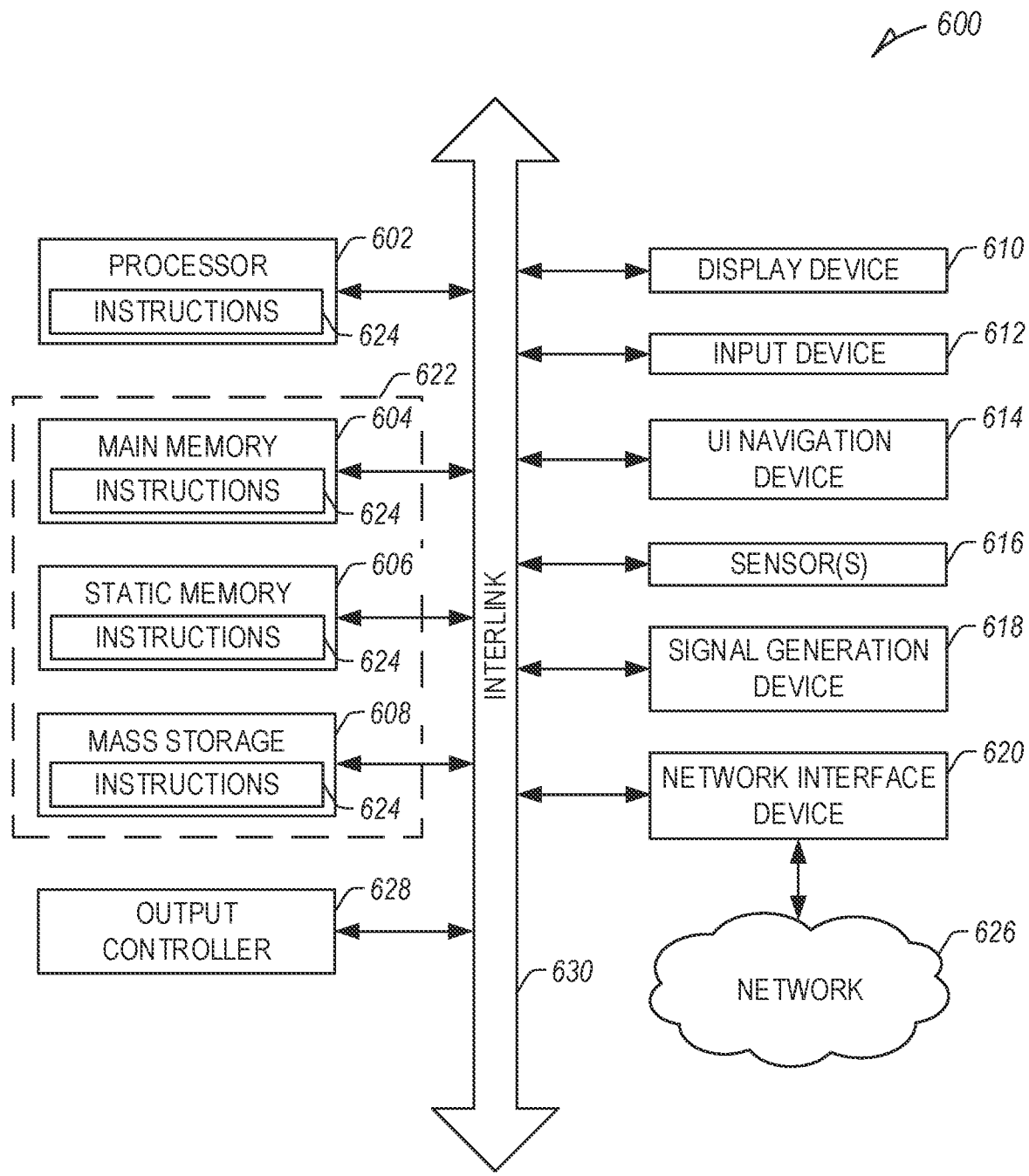
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. Portions of this description may apply to the computing framework of one or more of the dosimeters, circuits, or processors described herein. Examples, as described herein, may include, or may operate by, logic or a number of components, or mechanisms in the machine 600. Circuitry (e.g., processing circuitry, a dosimeter circuit, etc.) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612, and UI navigation device 614 may be a touch screen display. The machine 600 may additionally include a signal generation device 618 (e.g., a speaker), a network interface device 620, and one or more sensors 616, such as a global positioning system (GPS) sensor, compass, accelerometer, or one or more other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine-readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine-readable medium 622. While the machine-readable medium 622 is illustrated as a single medium, the term "machine-readable medium" may include a single medium or multiple media (e.g., a centralized or distributed database, and/or associated caches and servers) configured to store the one or more instructions 624.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software. A transmission medium is a machine-readable medium.

Various embodiments are illustrated in the figures above. One or more features from one or more of these embodiments may be combined to form other embodiments. Method examples described herein can be machine or computer-implemented at least in part. Some examples may include a computer-readable medium or machine-readable medium encoded with instructions operable to configure an electronic device or system to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times.

An example (e.g., "Example 1") of subject matter (e.g., a vocal acoustic attenuation system) may comprise an acoustic sensor having a sound port in a first surface of the acoustic sensor and an attenuation material secured to the acoustic sensor and covering the sound port, wherein the attenuation material is configured to attenuate an acoustic signal received at a first surface of the attenuation material and the acoustic sensor is configured to receive the attenuated acoustic signal through the attenuation material and to provide an attenuated output signal.

In Example 2, the subject matter of Example 1 may optionally be configured such that the attenuation material is secured to the acoustic sensor and covering the sound port to reduce an air gap over the sound port.

In Example 3, the subject matter of any one or more of Examples 1-2 may optionally be configured such that the attenuation material is secured to the acoustic sensor and covering the sound port to reduce or eliminate fluid communication between the sound port and an area over the first surface of the acoustic sensor.

In Example 4, the subject matter of any one or more of Examples 1-3 may optionally be configured to comprise an adhesive material configured to adhere the attenuation material to the acoustic sensor.

In Example 5, the subject matter of any one or more of Examples 1-4 may optionally be configured such that the attenuation material is configured to cover a portion of the first surface of the acoustic sensor, wherein the adhesive material of any one or more of Examples 1-4 may optionally be configured to adhere the attenuation material to the portion of the first surface of the acoustic sensor, wherein the attenuation material and the adhesive material of any one or more of Examples 1-4 may optionally be configured to attenuate the acoustic signal received at the first surface of the attenuation material, and wherein the acoustic sensor of any one or more of Examples 1-4 may optionally be configured to receive the attenuated acoustic signal through the attenuation material and the adhesive material and to provide the attenuated output signal.

In Example 6, the subject matter of any one or more of Examples 1-5 may optionally be configured such that the attenuation material is configured to attenuate a vocal audible decibel range from the acoustic signal to a range below a noise floor of the acoustic sensor prior to the acoustic signal reaching the acoustic sensor.

In Example 7, the subject matter of any one or more of Examples 1-6 may optionally be configured such that the vocal audible decibel range comprises acoustic sound pressure levels below 90 dB and the noise floor of the acoustic sensor comprises an acoustic sound pressure level below 35 dB.

In Example 8, the subject matter of any one or more of Examples 1-7 may optionally be configured such that the attenuation material comprises a tape material having an adhesive material covering the sound port of the acoustic sensor.

In Example 9, the subject matter of any one or more of Examples 1-8 may optionally be configured to comprise a dosimeter circuit configured to measure exposure to acoustic noise using the attenuated output signal.

In Example 10, the subject matter of any one or more of Examples 1-9 may optionally be configured to comprise a dosimeter circuit coupled to the acoustic sensor, the dosimeter circuit configured to measure exposure to acoustic events, comprising impulse events, having unattenuated sound pressure levels greater than 80 dB using the attenuated output signal.

In Example 11, the subject matter of any one or more of Examples 1-10 may optionally be configured to comprise a wearable housing comprising the acoustic sensor and the dosimeter circuit.

An example (e.g., "Example 12") of subject matter (e.g., a method) may comprise receiving an acoustic signal at a first surface of an attenuation material, the attenuation material secured to an acoustic sensor having a sound port in a first surface of the acoustic sensor, the attenuation material covering the sound port, attenuating, using the attenuation material, the acoustic signal received at the first surface of the attenuation material, receiving the attenuated acoustic signal through the attenuation material at the sound port of the acoustic sensor, and providing, using the acoustic sensor, an attenuated output signal.

In Example 13, the subject matter of Example 12 may optionally be configured such that the attenuation material is secured to the acoustic sensor and covering the sound port to reduce an air gap over the sound port.

In Example 14, the subject matter of any one or more of Examples 1-13 may optionally be configured such that the attenuation material is secured to the acoustic sensor and covering the sound port to reduce or eliminate fluid communication between the sound port and an area over the first surface of the acoustic sensor.

In Example 15, the subject matter of any one or more of Examples 1-14 may optionally be configured such that the attenuation material is adhered to the acoustic sensor with an adhesive material.

In Example 16, the subject matter of any one or more of Examples 1-15 may optionally be configured such that the attenuation material is configured to cover a portion of the first surface of the acoustic sensor and the attenuation material is adhered to the portion of the first surface of the acoustic sensor with the adhesive material, wherein attenuating the acoustic signal comprises using the attenuation material and the adhesive material and receiving the attenuated acoustic signal through the attenuation material at the sound port of the acoustic sensor comprises receiving the attenuated acoustic signal through the attenuation material and the adhesive material.

In Example 17, the subject matter of any one or more of Examples 1-16 may optionally be configured such that the acoustic sensor has a noise floor, wherein attenuating the acoustic signal comprises attenuating, using the attenuation material, a vocal audible decibel range from the acoustic signal to a range below the noise floor of the acoustic sensor prior to the acoustic sensor receiving the attenuated acoustic signal.

In Example 18, the subject matter of any one or more of Examples 1-17 may optionally be configured such that the vocal audible decibel range comprises acoustic sound pressure levels below 90 dB, and the noise floor of the acoustic sensor comprises an acoustic sound pressure level below 35 dB.

In Example 19, the subject matter of any one or more of Examples 1-18 may optionally be configured such that the attenuation material comprises a tape material having an adhesive material covering the sound port of the acoustic sensor.

In Example 20, the subject matter of any one or more of Examples 1-19 may optionally comprise measuring exposure of the acoustic sensor to acoustic events having unattenuated sound pressure levels greater than 80 dB using the attenuated output signal using a dosimeter circuit coupled to the acoustic sensor, wherein acoustic events optionally include impulse events.

An example (e.g., "Example 21") of subject matter (e.g., a vocal acoustic attenuation system) may comprise an acoustic sensor having a first surface and an attenuation material secured to the acoustic sensor and covering at least a portion of the first surface of the acoustic sensor, wherein the attenuation material is configured to attenuate an acoustic signal received at a first surface of the attenuation material, and wherein the acoustic sensor is configured to receive the attenuated acoustic signal through the attenuation material and to provide an attenuated output signal.

In Example 22, the subject matter of Example 21 may optionally be configured such that the attenuation material is secured to the acoustic sensor.

In Example 23, the subject matter of any one or more of Examples 21-22 may optionally be configured such that the acoustic sensor includes a sound port in the first surface of the acoustic sensor and the attenuation material covers the sound port.

In Example 24, the subject matter of any one or more of Examples 21-23 may optionally be configured such that the attenuation material is secured to the acoustic sensor and covering the sound port to reduce an air gap over the sound port.

In Example 25, the subject matter of any one or more of Examples 21-24 may optionally be configured such that the attenuation material is secured to the acoustic sensor and covering the sound port to reduce or eliminate fluid communication between the sound port and an area over the first surface of the acoustic sensor.

In Example 26, the subject matter of any one or more of Examples 21-25 may optionally be configured to comprise an adhesive material configured to adhere the attenuation material to the acoustic sensor.

In Example 27, the subject matter of any one or more of Examples 21-26 may optionally be configured such that the attenuation material is configured to cover a portion of the first surface of the acoustic sensor, the adhesive material is configured to adhere the attenuation material to the portion of the first surface of the acoustic sensor, the attenuation material and the adhesive material are configured to attenuate the acoustic signal received at the first surface of the attenuation material, and the acoustic sensor is configured to receive the attenuated acoustic signal through the attenuation material and the adhesive material and to provide the attenuated output signal.

In Example 28, the subject matter of any one or more of Examples 21-27 may optionally be configured such that the attenuation material is configured to attenuate a vocal audible decibel range from the acoustic signal to a range below a noise floor of the acoustic sensor prior to the acoustic signal reaching the acoustic sensor.

In Example 29, the subject matter of any one or more of Examples 21-28 may optionally be configured such that the vocal audible decibel range comprises acoustic sound pressure levels below 90 dB and the noise floor of the acoustic sensor comprises an acoustic sound pressure level below 35 dB.

In Example 30, the subject matter of any one or more of Examples 21-29 may optionally be configured such that the acoustic sensor includes a sound port in the first surface and the attenuation material comprises a tape material having an adhesive material covering the sound port of the acoustic sensor.

In Example 31, the subject matter of any one or more of Examples 21-30 may optionally be configured to comprise a dosimeter circuit configured to measure exposure to acoustic noise using the attenuated output signal.

In Example 32, the subject matter of any one or more of Examples 21-31 may optionally be configured to comprise a dosimeter circuit coupled to the acoustic sensor, the dosimeter circuit configured to measure exposure to acoustic events, comprising impulse events, having unattenuated sound pressure levels greater than 80 dB using the attenuated output signal.

In Example 33, the subject matter of any one or more of Examples 21-32 may optionally be configured to comprise a wearable housing comprising the acoustic sensor and the dosimeter circuit.

An example (e.g., "Example 34") of subject matter (e.g., a method) may comprise receiving an acoustic signal at a first surface of an attenuation material, the attenuation material secured to and covering at least a portion of a first surface of an acoustic sensor, attenuating, using the attenuation material, the acoustic signal received at the first surface of the attenuation material, receiving, using the acoustic sensor, the attenuated acoustic signal through the attenuation material, and providing, using the acoustic sensor, an attenuated output signal.

In Example 35, the subject matter of Example 34 may optionally be configured such that wherein the attenuation material is secured to the acoustic sensor.

In Example 36, the subject matter of any one or more of Examples 34-35 may optionally be configured such that the acoustic sensor includes a sound port in the first surface of the acoustic sensor and the attenuation material covers the sound port.

In Example 37, the subject matter of any one or more of Examples 34-36 may optionally be configured such that the attenuation material is secured to the acoustic sensor and covering the sound port to reduce or eliminate fluid communication between the sound port and an area over the first surface of the acoustic sensor.

In Example 38, the subject matter of any one or more of Examples 34-37 may optionally be configured such that the attenuation material is adhered to the acoustic sensor with an adhesive material.

In Example 39, the subject matter of any one or more of Examples 34-38 may optionally be configured such that the attenuation material is configured to cover a portion of the first surface of the acoustic sensor, the attenuation material is adhered to the portion of the first surface of the acoustic sensor with the adhesive material, attenuating the acoustic signal comprises using the attenuation material and the adhesive material, and receiving the attenuated acoustic signal through the attenuation material comprises receiving the attenuated acoustic signal through the attenuation material and the adhesive material.

In Example 40, the subject matter of any one or more of Examples 34-39 may optionally be configured such that the acoustic sensor has a noise floor and attenuating the acoustic signal comprises attenuating, using the attenuation material, a vocal audible decibel range from the acoustic signal to a range below the noise floor of the acoustic sensor prior to the acoustic sensor receiving the attenuated acoustic signal.

In Example 41, the subject matter of any one or more of Examples 34-40 may optionally be configured such that the vocal audible decibel range comprises acoustic sound pressure levels below 90 dB and the noise floor of the acoustic sensor comprises an acoustic sound pressure level below 35 dB.

In Example 42, the subject matter of any one or more of Examples 34-41 may optionally be configured such that the acoustic sensor includes a sound port in the first surface and the attenuation material comprises a tape material having an adhesive material covering the sound port of the acoustic sensor.

In Example 43, the subject matter of any one or more of Examples 34-42 may optionally be configured to comprise measuring exposure of the acoustic sensor to acoustic events having unattenuated sound pressure levels greater than 80 dB using the attenuated output signal using a dosimeter circuit coupled to the acoustic sensor, wherein acoustic events include impulse events.

In Example 44, subject matter (e.g., a system or apparatus) may optionally combine any portion or combination of any portion of any one or more of Examples 1-43 to comprise "means for" performing any portion of any one or more of the functions or methods of Examples 1-43, or at least one "non-transitory machine-readable medium" including instructions that, when performed by a machine, cause the machine to perform any portion of any one or more of the functions or methods of Examples 1-43.

The above detailed description is intended to be illustrative, and not restrictive. The scope of the disclosure should, therefore, be determined with references to the appended claims, along with the full scope of equivalents to which such claims are entitled.

What is claimed is:

1. A vocal acoustic attenuation apparatus comprising:
an acoustic sensor having a first surface; and
an attenuation material secured to the acoustic sensor and covering at least a portion of the first surface of the acoustic sensor,
wherein the attenuation material is configured to attenuate a vocal audible decibel range from an acoustic signal received at a first surface of the attenuation material, and
wherein the acoustic sensor is configured to receive the attenuated acoustic signal through the attenuation material and to provide an attenuated output signal.

2. The vocal acoustic attenuation apparatus of claim 1, wherein the attenuation material is a component of the vocal acoustic attenuation apparatus and is secured to the acoustic sensor.

3. The vocal acoustic attenuation apparatus of claim 1, wherein the acoustic sensor includes a sound port in the first surface of the acoustic sensor, and wherein the attenuation material covers the sound port to reduce or eliminate air communication between the sound port and an area over the first surface of the acoustic sensor.

4. The vocal acoustic attenuation apparatus of claim 3, wherein the attenuation material is secured to the acoustic sensor and covering the sound port to reduce an air gap over the sound port and to eliminate air communication between the sound port and the area over the first surface of the acoustic sensor.

5. The vocal acoustic attenuation apparatus of claim 1, comprising:
an adhesive material configured to adhere the attenuation material to the first surface of the acoustic sensor, wherein the acoustic sensor has a noise floor between 20 dB and 35 dB.

6. The vocal acoustic attenuation apparatus of claim 5, wherein the attenuation material is configured to cover a portion of the first surface of the acoustic sensor,
wherein the adhesive material is configured to adhere the attenuation material to the portion of the first surface of the acoustic sensor,
wherein the attenuation material and the adhesive material are configured to attenuate the acoustic signal received at the first surface of the attenuation material, and
wherein the acoustic sensor is configured to receive the attenuated acoustic signal through the attenuation material and the adhesive material and to provide the attenuated output signal.

7. The vocal acoustic attenuation apparatus of claim 1, wherein the attenuation material is configured to attenuate the vocal audible decibel range from the acoustic signal to a range below a noise floor of the acoustic sensor prior to the acoustic signal reaching the acoustic sensor.

8. The vocal acoustic attenuation apparatus of claim 5, wherein the vocal audible decibel range comprises acoustic sound pressure levels below and up to 90 dB, and
wherein the noise floor of the acoustic sensor comprises an acoustic sound pressure level below 35 dB.

9. The vocal acoustic attenuation apparatus of claim 1, wherein the acoustic sensor includes a sound port in the first surface, and
wherein the attenuation material comprises a tape material having an adhesive material covering the sound port of the acoustic sensor.

10. The vocal acoustic attenuation apparatus of claim 1, comprising a dosimeter circuit configured to measure exposure to acoustic noise using the attenuated output signal.

11. The vocal acoustic attenuation apparatus of claim 1, comprising a dosimeter circuit coupled to the acoustic sensor, the dosimeter circuit configured to measure exposure to acoustic events, comprising impulse events, having unattenuated sound pressure levels greater than 80 dB using the attenuated output signal.

12. The vocal acoustic attenuation apparatus of claim 11, comprising a housing comprising the acoustic sensor and the dosimeter circuit.

13. The vocal acoustic attenuation apparatus of claim 1, comprising a housing, the housing comprising the acoustic sensor and the attenuation material,
wherein the first surface is a top surface, wherein the attenuation material includes a polyester material configured to cover at least a portion of the top surface to reduce or eliminate acoustic transmission of the acoustic signal from outside of the acoustic sensor.

14. A vocal acoustic attenuation method comprising:
receiving an acoustic signal at a first surface of an attenuation material, the attenuation material secured to and covering at least a portion of a first surface of an acoustic sensor;
attenuating, using the attenuation material, a vocal audible decibel range from the acoustic signal received at the first surface of the attenuation material;
receiving, using the acoustic sensor, the attenuated acoustic signal through the attenuation material; and
providing, using the acoustic sensor, an attenuated output signal.

15. The vocal acoustic attenuation method of claim 14, wherein the attenuation material and the acoustic sensor are components of an apparatus and the attenuation material is secured to the acoustic sensor.

16. The vocal acoustic attenuation method of claim 15, wherein the acoustic sensor includes a sound port in the first surface of the acoustic sensor,
wherein the attenuation material covers the sound port to eliminate air communication between the sound port and an area over the first surface of the acoustic sensor.

17. The vocal acoustic attenuation method of claim 14, wherein the attenuation material is adhered to the first surface of the acoustic sensor with an adhesive material,
wherein the impulse sensor has a noise floor between 20 dB and 35 dB,
wherein the attenuation material is configured to cover a portion of the first surface of the acoustic sensor,
wherein the attenuation material is adhered to the portion of the first surface of the acoustic sensor with the adhesive material,
wherein attenuating the acoustic signal comprises using the attenuation material and the adhesive material, and
wherein receiving the attenuated acoustic signal through the attenuation material comprises receiving the attenuated acoustic signal through the attenuation material and the adhesive material.

18. The vocal acoustic attenuation method of claim 14, wherein attenuating the acoustic signal comprises attenuating, using the attenuation material, a vocal audible decibel range from the acoustic signal to a range below a noise floor of the acoustic sensor prior to the acoustic sensor receiving the attenuated acoustic signal,
wherein the vocal audible decibel range comprises acoustic sound pressure levels below and up to 90 dB, and
wherein the noise floor of the acoustic sensor comprises an acoustic sound pressure level below 35 dB.

19. The vocal acoustic attenuation method of claim 14, comprising:
measuring exposure of the acoustic sensor to acoustic events having unattenuated sound pressure levels greater than 80 dB using the attenuated output signal using a dosimeter circuit coupled to the acoustic sensor, wherein acoustic events include impulse events.

20. The vocal acoustic attenuation method of claim 14, wherein the acoustic sensor and the attenuation material are components of a housing,
wherein the first surface is a top surface, wherein the attenuation material includes a polyester material configured to cover at least a portion of the top surface to reduce or eliminate acoustic transmission of the acoustic signal from outside of the acoustic sensor.

* * * * *